(12) United States Patent
Kudo et al.

(10) Patent No.: US 8,156,986 B2
(45) Date of Patent: Apr. 17, 2012

(54) METHOD AND APPARATUS OF FABRICATING CARCASS MEMBER FOR TIRE

(75) Inventors: Shigeo Kudo, Osaka (JP); Tetsuo Tatara, Osaka (JP); Osamu Fujiki, Osaka (JP)

(73) Assignee: Toyo Tire & Rubber Co., Ltd., Osaka-shi (JP)

( * ) Notice: Subject to any disclaimer, the term of this patent is extended or adjusted under 35 U.S.C. 154(b) by 0 days.

(21) Appl. No.: 13/108,540

(22) Filed: May 16, 2011

(65) Prior Publication Data

US 2011/0214817 A1    Sep. 8, 2011

Related U.S. Application Data

(62) Division of application No. 12/162,421, filed as application No. PCT/JP2006/301452 on Jan. 30, 2006.

(51) Int. Cl.
*B29D 30/20* (2006.01)

(52) U.S. Cl. ............ 156/397; 156/117; 156/130.7; 156/133; 156/174; 156/193; 156/426; 57/295; 57/297

(58) Field of Classification Search ............ 156/117, 156/121, 124, 130, 397, 910, 123, 133, 130.7, 156/174, 184, 193, 296, 390, 425, 426, 427, 156/443, 446, 459; 152/548, 556; 57/295, 57/297
See application file for complete search history.

(56) References Cited

U.S. PATENT DOCUMENTS

| 1,453,865 | A | * | 5/1923 | Springer et al. | 156/117 |
|---|---|---|---|---|---|
| 4,126,720 | A | | 11/1978 | Edwards | |
| 5,379,818 | A | * | 1/1995 | Suzuki et al. | 152/531 |
| 6,425,426 | B1 | | 7/2002 | Osborne et al. | |
| 6,913,058 | B1 | * | 7/2005 | Takagi | 156/397 |
| 2005/0061412 | A1 | * | 3/2005 | Noto et al. | 152/510 |
| 2005/0076994 | A1 | * | 4/2005 | Yoshida | 156/123 |
| 2005/0077011 | A1 | * | 4/2005 | Pialot | 156/397 |

FOREIGN PATENT DOCUMENTS

JP        35-018602 B1   12/1960
(Continued)

OTHER PUBLICATIONS

English language Abstract of JP 04-355121.*
(Continued)

*Primary Examiner* — Richard Crispino
*Assistant Examiner* — Martin Rogers
(74) *Attorney, Agent, or Firm* — Westerman, Hattori, Daniels & Adrian, LLP

(57) ABSTRACT

The invention can efficiently provide a carcass member constituting a carcass layer of a radial tire, particularly, a carcass member a direction of a cord of which constitutes an angle of substantially 90° relative to a tire circumferential direction, and can easily adjust a length in accordance with a size, one piece of a cord (C) is continuously passed through a rubber coating die (14) to coat rubber on the cord, the rubber coated cord (C1) is shaped such that a sectional outer shape thereof constitutes an elliptical shape, the rubber coated cord (C1) is wound around an aligning drum (30) while adjusting a direction of the elliptical shape by way of an aligning guide (20) to bond without producing a gap to form a cylinder-like member (A1), thereafter, the cylinder-like member (A1) is cut in a direction in parallel with the drum axis center to constitute a sheet-like shape.

3 Claims, 7 Drawing Sheets

FOREIGN PATENT DOCUMENTS

| | | | |
|---|---|---|---|
| JP | 04-355121 | * | 12/1992 |
| JP | 04-355121 A | | 12/1992 |
| JP | 04-254274 | * | 9/1997 |
| JP | 2001-145961 A | | 5/2001 |
| JP | 2002-321267 A | | 11/2002 |
| JP | 2004-142451 A | | 5/2004 |
| JP | 2004-330566 A | | 11/2004 |
| JP | 2005-028688 A | | 2/2005 |
| JP | 2005-053112 A | | 3/2005 |
| WO | WO 01/17760 | * | 3/2001 |
| WO | WO 03/055697 | * | 7/2003 |

OTHER PUBLICATIONS

International Search Report of PCT/JP2006/301452, date of mailing Apr. 11, 2006.

* cited by examiner

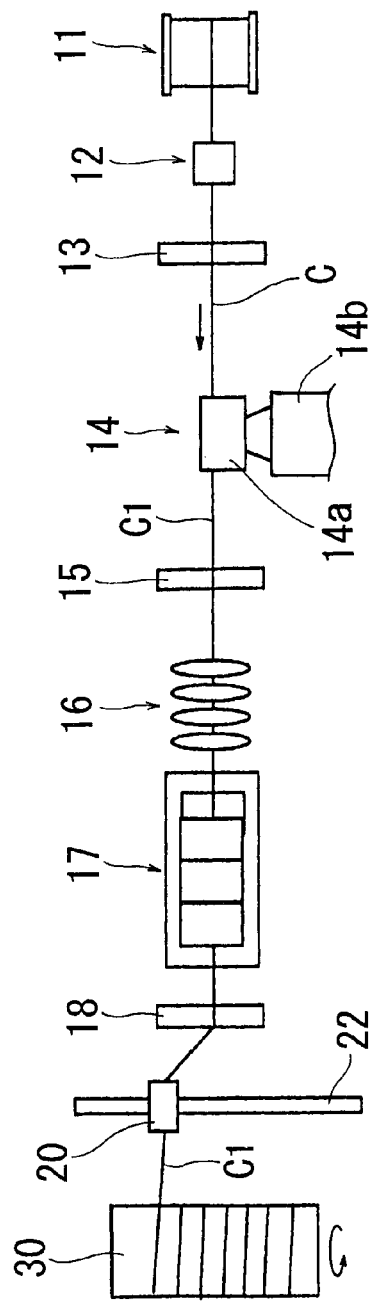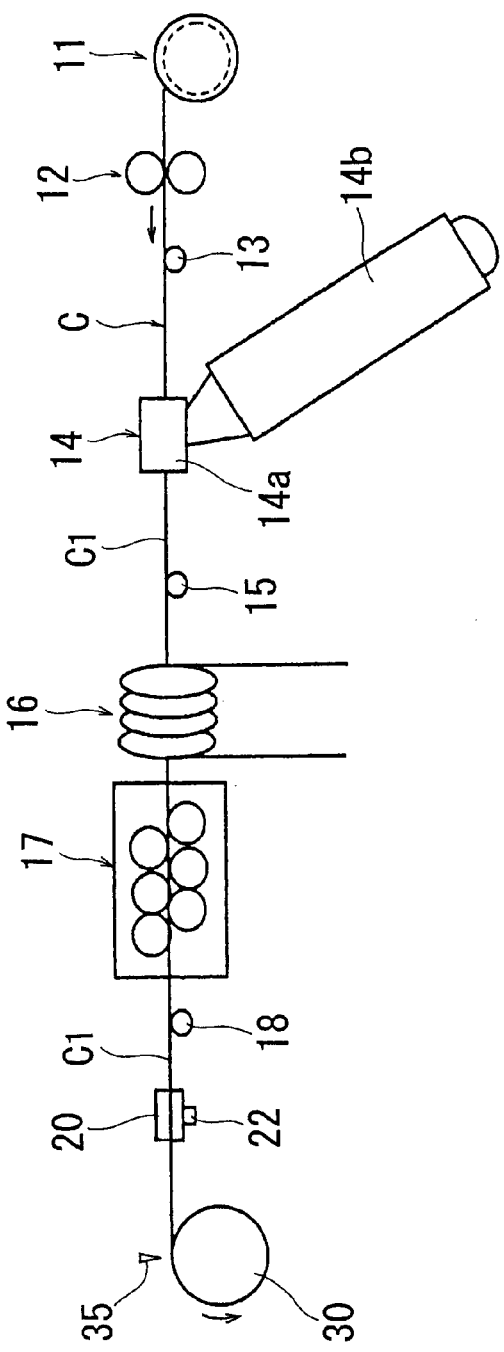

PRIOR ART

METHOD AND APPARATUS OF FABRICATING CARCASS MEMBER FOR TIRE

CROSS-REFERENCE TO RELATED APPLICATIONS

This application is a Divisional of application Ser. No. 12/162,421, filed Feb. 5, 2009, and wherein application Ser. No. 12/162,421 is a national stage application filed under 35 USC §371 of International Application No. PCT/JP2006/301452, filed Jan. 30, 2006, the contents of which are incorporated herein by reference in their entirety.

TECHNICAL FIELD

The present invention relates to a method and an apparatus of fabricating a carcass member used in a carcass layer of a radial tire.

BACKGROUND ART

Generally, a radial tire is formed by a plurality of tire components (constituting members). For example, as shown by FIG. 13, a tire T is manufactured by combining rubber members such as an inner liner 2, a tread 3, a side wall 4, a rim strip 5, and tire reinforcing members such as a carcass layer 1, a belt layer 7 which have therein a cord made of a fabric or made of a metal. Numeral 8 in the drawing designates a bead portion including a bead core 9.

As the carcass member (carcass ply) constituting the carcass layer of the radial tire, there is used a so-to-speak topping sheet topped (covered) with rubber by constituting a core member by a number of pieces of cords for reinforcement.

In a background art, such a carcass member for a tire uses a so-to-speak cord-like fabric of a comparatively wide width woven by constituting yarn mainly by a cord made by a synthetic fabric constituting a core member and roughly striking slender weft having as a connection at required intervals in yarn direction, rubber is topped to the cord-like fabric at a calendering step, at a next step, the fabric is cut to a predetermined width in accordance with a width of a carcass layer, the cords are directed in a transverse direction to be jointed successively to form in a shape of a long strip, thereafter, wound in a roll-like shape by interposing a separating cross to be jointed to be stocked, which is carried to a tire building step and is used by being cut to a predetermined length.

However, according to the method, there is needed a wide area for stocking a material or a fabricated carcass member of a material storage of a cord-like fabric or the like before being topped by calender or a storage of a carcass member which has been topped or the like, and personnels for transportation or the like are needed, a problem is proposed in a productivity, and the method is disadvantageous for building a tire of many kinds and small quantity production.

Therefore, in recent years, it is proposed to form a carcass member in a shape of a strip having a comparatively slender width by aligning a plurality of pieces of cords for reinforcement and topping the cords with rubber without using a cord-like fabric and build a carcass layer of a tire thereby.

For example, Patent Reference 1 and Patent Reference 2 disclose that by aligning a plurality of pieces of cords and passing the cords through a die for topping continuously provided with an extruder, rubber is topped to the cord rows to form into a strip-like shape, the strip-like member is cut by a predetermined length and the cut pieces are successively aligned to be bonded on a building drum or a conveyor, or the strip-like member is wound spirally on a drum for forming a sheet, the formed cylinder-like member is cut in a direction in parallel with a drum axis center (width direction) to form a carcass member in which the cord constitutes an angle of 90° substantially relative to a circumferential direction.

However, when the cut pieces of the strip-like member are aligned and bonded, time and labor is taken for cutting the strip-like member after having been topped and bonding the cut pieces to pose a problem that high speed formation cannot be desired, further, when the cylinder-like member spirally wound with the strip-like member is cut, the strip-like member is wound spirally with an angle in accordance with a width of the strip-like member, and therefore, there poses a problem that the carcass layer the cord of which constitutes the angle of substantially 90° relative to the tire circumferential direction cannot be formed.

Furthermore, in either of the cases, it is necessary to calculate and adjust strictly the width of the strip-like member to be fabricated in accordance with a circumferential length and a joint margin of the carcass layer of the tire constituting an object of building and a problem is posed in a productivity. Particularly, when a carcass layer is constituted by two layers, circumferential lengths thereof differ by a first layer on an inner side and a second layer on an outer side, and therefore, it is extremely difficult to calculate the width, depending on cases, it is also necessary to subject an end portion to process to cut in accordance with a length thereof.

Patent Reference 1: JP-A-2002-321267
Patent Reference 2: JP-A-2005-28688

DISCLOSURE OF THE INVENTION

Problems that the Invention is to Solve

The invention resolves the above-described problem and provides a method and an apparatus of fabricating a tire carcass member capable of efficiently fabricating a carcass member for a tire used for a carcass layer of a radial tire by using one piece of a rubber coated cord coated with rubber, particularly, capable of providing a carcass member in which a cord for reinforcement makes an angle of substantially 90° relative to a tire circumferential direction and capable of easily adjusting a length or the like in accordance with a size.

Means for Solving the Problems

The invention is directed to a method of fabricating a carcass member for a tire, characterized by passing one piece of a cord continuously through a die for coating rubber to coat the rubber on the cord, shaping the rubber coated cord to constitute a predetermined sectional outer shape, winding the rubber coated cord around an aligning drum having a circumferential length and a length in accordance with a width and a length of a carcass member constituting an object of fabrication to align to bond without producing a gap to form a cylinder-like member of a predetermined length, and thereafter, cutting the cylinder-like member in a direction in parallel with a drum axis center to be formed into a sheet-like shape.

According to the fabricating method, one piece of the rubber coated cord is wound around the aligning drum without producing a gap, and therefore, although the cord is wound spirally, the cord substantially constitutes 90° relative to the cutting direction in parallel with the drum axis center. Therefore, a carcass layer a carcass cord of which constitutes an angle of substantially 90° relative to a tire circumferential direction can be constituted by using the carcass member in the sheet-like shape provided as described above by directing the cut end in the tire circumferential direction by converting longitudinal and transverse directions thereof. Further, the carcass member can be used as one sheet of the carcass member the same as that of the background art, and therefore, a number of joint portions are not produced as in a case of bonding a number of cut pieces of a strip-like member and there is not a concern of deteriorating a weight balance of a tire.

Further, the cylinder-like member is formed by winding one piece of the rubber coated cord around the aligning drum, and therefore, a length in the circumferential direction of the carcass member, that is, a number of pieces of cords necessary for a length in an axial direction of the cylinder-like member can be set by a unit of one piece of the cord by increasing or reducing a number of times of winding the cord. Further, the length in an axial direction of the cylinder-like member can easily be adjusted by a unit of a dimension of an amount of one piece of the cord and can easily deal with also a change in a tire size.

In the method of fabricating a carcass member for a tire, it is also possible that when the rubber coated cord is shaped such that the sectional outer shape constitutes an elliptical shape and the rubber coated cord is wound around the aligning drum, in accordance with a mode of the carcass member constituting an object of fabrication, the cord is wound by adjusting a direction of the elliptical shape.

Thereby, when the cord is wound around the aligning drum while using the same rubber coated cord, a pitch of winding the cord can arbitrarily be changed by adjusting to change the direction of the elliptical shape such that, for example, the direction of along diameter thereof is changed in any of a parallel direction, a skewed direction, or a vertical direction relative to the drum circumferential face, or the directions are mixed. Therefore, a number of pieces of the cords or a density thereof can freely be changed without changing a length in an axial direction of the cylinder-like member formed, that is, a length in a circumferential direction of the carcass member. Further, conversely, the length in the axial direction of the cylinder-like member formed, that is, the length in the circumferential direction of the carcass member can be adjusted without changing the number of times of winding the cord on the aligning drum. That is, a carcass member having an aimed mode or property can easily be provided. Further, more number of kinds of modes of carcass members can be provided by combining to adjust a direction of the elliptical shape and adjust the number of times of winding the cord.

In the method of fabricating a carcass member for a tire, it is preferable that the rubber coated cord is passed through inside of a heating atmosphere until being wound around the aligning drum. Thereby, the coated rubber is cured to some degree, an aligning degree is increased by stabilizing a state of winding the cord around the drum, a carcass member having an excellent accuracy can be fabricated, and therefore, the coated rubber is made to be able to be thin-walled and also a vulcanization time period is made to be able to be shortened.

Further, the invention is directed to an apparatus of fabricating a carcass member for a tire, characterized by including a portion of supplying one piece of a cord, a rubber coating die for coating rubber on the cord while passing the cord continuously drawn from the supply portion to shape in a predetermined sectional outer shape, an aligning guide having a guide hole for passing a rubber coated cord passing through the rubber coating die and capable of moving in a direction of being intersected with a direction of feeding the rubber coated cord, an aligning drum which is a drum wound with the rubber coated cord passing through the aligning guide, made to be rotatable centering on an axis center in parallel with the direction of moving the aligning guide and having a circumferential length in correspondence with a width of the carcass member constituting an object of fabrication, and a cutting apparatus for cutting a cylinder-like member formed by the rubber coated cord wound around the aligning drum in the direction in parallel with the drum axis center, wherein the aligning guide is constituted to be able to wind the rubber coated cord around the aligning drum to align to bond without producing a gap while adjusting a position of the rubber coated cord passing through the aligning guide by controlling to move the aligning guide.

According to the apparatus of fabricating a carcass member for a tire, the rubber coated cord passing through the rubber coating die can accurately be wound around the drum to be bonded without producing a gap while being aligned by the aligning guide, further, the cylinder-like member aligned to be formed can easily be cut, and therefore, the fabricating method of the invention can excellently be embodied.

Further, it is preferable that the rubber coating die is provided to shape the sectional outer shape of the rubber coated cord by an elliptical shape. In this case, it is preferable that the aligning guide is provided such that a shape of a mouth portion of at least a delivery side end portion of the guide hole is made to constitute an elliptical shape in correspondence with the sectional outer shape of the rubber coated cord to be able to pivot centering on the guide hole, and is constituted to be able to change a direction of the elliptical shape by controlling to pivot the aligning guide in accordance with moving the aligning guide.

As described above, the rubber coated cord is produced to have the elliptical shape in the cross-section of the rubber coated cord and continuously in its longitudinal direction. During the production, the direction of the elliptical shape can being changed by rotating the pivotably provided aligning guide when wound to the aligning drum, whereby a pitch or the like for winding the rubber coated cord can pertinently be adjusted as a result of the change during the winding process. Therefore, the length in the axial direction of the cylinder-like member formed which defines the length in the circumferential direction of the carcass member can easily be adjusted. Further, the number of times of winding of the cord, which defines the number of pieces of the cords of the carcass member fabricated can easily be changed without changing the length in the axial direction. Therefore, the carcass member can easily be provided in a desired form.

It is preferable that a heating apparatus capable of heating the coated rubber of the rubber coated cord to some degree is provided at a portion of feeding the rubber coated cord from the rubber coating die to reach the aligning guide. Thereby, the coated rubber is cured to some degree by passing the rubber coated cord in the heating atmosphere, a state of aligning the cords wound around the aligning drum is stabilized to align and an accurate carcass member can be fabricated.

It is possible that the aligning drum is provided with a slit for cutting and guiding the rubber coated cord in a width direction in parallel with the axis center of the drum main body at one portion in a circumferential direction of the drum main body, and a cylinder-like member formed by winding the rubber coated cord is made to be able to be cut along the slit by a cutter of the cutting apparatus.

Thereby, the cylinder-like member by the rubber coated cord wound around the aligning drum can firmly be cut in a direction orthogonal to the direction of winding the rubber coated cord constituting substantially the drum circumferential direction. Therefore, the carcass member in a shape of a cut sheet can constitute a carcass layer in which the carcass cord constitutes an angle of substantially 90° relative to the tire circumferential direction by using the cut end by directing the cut end in the tire circumferential direction.

Advantage of the Invention

According the method and the apparatus of fabricating the carcass member for the tire of the invention, the carcass member for the tire used in the carcass layer of the radial tire can efficiently be fabricated by using one piece of the rubber coated cord coated with rubber. Particularly, the carcass member in which the carcass cord of the tire constitutes an angle of substantially 90° relative to the tire circumferential direction can be provided. Further, the length in accordance with the size can easily be adjusted and the number of cords can easily be adjusted in fabrication.

BEST MODE FOR CARRYING OUT THE INVENTION

Next, embodiments of the invention will be explained based on embodiments shown in the drawings as follows.

FIG. 1 and FIG. 2 are an outline plane view and an outline side view showing an outline of a step of embodying a method of fabricating a carcass member for a tire of the invention.

In the drawings, numeral 11 designates a supply portion of a cord C made by a synthetic fabric of nylon, a polyester or the like, and provided to be able to draw to supply continuously one piece of cord C wound around a bobbin by being subjected to be processed by a predetermined adhering agent. Numeral 12 designates an elongating roll for correcting curl or warp or the like of the cord C drawn out as described above, and numeral 13 designates a guide roll.

Numeral 14 designates a rubber coating die constituted by providing an extruder 14b for extruding to supply a predetermined rubber material continuously to a die main body 14a having an inner hole portion for passing the cord C and is provided to coat rubber to the cord C passing the inner hole portion with rubber by a predetermined thickness. Although an outer shape of a section by the coated rubber can be constituted by various shapes of a circular shape, and an elliptical shape, a polygonal shape of a rectangular shape of a section or the like and the like, it is preferable that the outer shape is constituted by an elliptical shape as in the embodiment illustrated in embodying.

In the case of the illustrated embodiment, a shape of a mouth portion 14c at an end portion on a delivery side of the inner hole portion is constituted by an elliptical shape as shown by FIG. 3 such that the sectional outer shape of the rubber coated cord C1 delivered by being coated with rubber can be shaped to constitute the elliptical shape. Thereby, the section of the outer shape by rubber R coated to the cord C of the section in the circular shape is constituted by the elliptical shape in the section. Although a flatness of the elliptical shape, that is, a ratio of a long diameter and a short diameter or the like can pertinently be set, preferably, a range of the long diameter is 1.2 through 1.5 relative to a short diameter 1. Further, a thickness of the coated rubber R is made to be, for example, 0.2 through 0.8 mm. Numeral 15 designates a guide roll.

Numeral 16 in the drawings designates a heating apparatus of an electric heating type constituted by winding an electric heating line in a coil-like shape, provided such that the rubber coated cord C1 passes through a heating atmosphere at inside of the heating apparatus 16, thereby, the coated rubber R is made to be able to be heated to a degree of starting to be cured to some degree although the rubber is not completely cured.

Numeral 17 designates an elongating apparatus having a plurality of rolls provided successive to the heating apparatus 16, which is provided to be able to remove warp or the like of the rubber coated cord C1. Numeral 18 designates a guide roll.

Numeral 20 in the drawings designates an aligning guide for winding the rubber coated cord C1 fed as described above, and numeral 30 designates an aligning drum for winding and aligning the rubber coated cord C1 passing through the aligning guide 20.

The aligning guide 20 includes a guide hole 21 for passing the rubber coated cord C1, supported movably in a transverse direction intersecting with a direction of feeding the rubber coated cord C1, that is, an axial direction of the aligning drum 30 and is provided to be able to pertinently control to move the aligning guide 20. That is, the aligning guide 20 is provided to be able to align and wind the rubber coated cord C1 passing through the guide hole 21 by a predetermined pitch to be bonded to the aligning drum 30 without a clearance therebetween by controlling a movement (particularly, a speed or the like) of the aligning guide 20 in accordance with a rotational speed of the aligning drum 30 and a thickness of the cord.

As moving means of the aligning guide 20, various moving means (not illustrated) of a ball screw mechanism, a linear motor and the like can be utilized, all of the moving means are provided to be able to arbitrarily controlling the movement and capable of changing a pitch or the like of winding even in the midst of winding. Numeral 22 designates guide means for moving the aligning guide 20.

The aligning guide 20 is constituted such that at least a shape of a mouth portion at an end portion on a delivery side of the guide hole 21 is made to constitute an elliptical shape in accordance with the outer shape of the section of the rubber coated cord C1, the aligning guide 20 is provided pivotably centering on the guide hole 21, and by being controlled to pivot in accordance with controlling to move the aligning guide 20 as described above, a direction of the elliptical shape (directions of long diameter and short diameter) can pertinently be changed. As pivoting means of the aligning guide 20, for example, as shown by FIG. 4 and FIG. 5, a gear 23 is provided at an outer periphery of the aligning guide 20, a gear 24 brought in mesh with the gear 23 is provided to be driven to rotate by pertinent driving means (not illustrated), thereby, the pivoting means is provided to be able to control to pivot the aligning guide 20.

Further, as shown by FIG. 9, the aligning drum 30 is provided such that an axis center thereof is rotatably supported to be in parallel with the movement direction of the aligning guide 20, and by rotating the drum 30, the cylinder-like member A1 constituting the layer can be formed by spirally winding the rubber coated cord C1 passing through the aligning guide 20 to be bonded without a clearance.

The aligning drum 30 is constituted by a drum in a shape of the circular cylinder a circumferential length of which corresponds to a lateral width W of a carcass member A constituting an object of fabrication shown in FIG. 12 and an axial direction length L1 of which is longer than a length in a tire circumferential direction of the carcass member A, that is, a circumferential length of the carcass member A on a building drum at a building step. At one portion in the circumferential direction of the aligning drum 30, there is formed a slit 31 for a cutting guide of a length L2 slightly longer than a circumferential length of the carcass member 4 and slidely shorter than the axial length L1 of the drum 30.

The slit 31 serves as a guide in cutting into which a blade tip portion of a cutter 35 of a cutting apparatus is brought, and it is not necessary that the slit 31 penetrates inside of the aligning drum 30 as shown by the drawing but the slit 31 can be formed also in a shape of an unpenetrated groove.

Although as a material of the aligning drum 30, a comparatively light-weighted and an inexpensive metal material of aluminum or the like is facilitated to be interchanged in a case of size change and preferably used, the aligning drum 30 can also be formed by using other metal material.

Further, the cutter 35 may be any build of a cutter of a rotary blade, a side blade or the like so far as the cylinder-like member A1 constituted by the rubber coated cord C1 spirally wound around the aligning drum 30 can be cut at the portion of the slit 31.

An explanation will be given of a method of fabricating a carcass member A for a tire by using the fabricating apparatus constructed by the above-described constitution.

A reinforcement cord C continuously drawn from the supply portion 11 is passed through the elongating roll 12 and passed through the rubber coating die 14 while adjusting curl or warp thereof to thereby cover rubber R on a surface thereof. At this occasion, by constituting the shape of the mouth portion 14c of the end portion on the delivery side of the rubber coating die 14 by the elliptical shape, the rubber coated cord C1 coated with the rubber R is shaped to constitute the sectional outer shape by the elliptical shape and is delivered.

Next, the rubber coated cord C1 is passed in a heating atmosphere by the heating apparatus 16 to pertinently heat coated rubber to cure the coated rubber to some degree, thereafter, passed through the elongating apparatus 17 and guided to the aligning guide 20, and the rubber coated cord C1 passing through the aligning guide 20 is aligned to be wound around the aligning drum 30 by rotating the drum while gradually moving the aligning guide 20 in a direction in parallel with the axial direction of the aligning drum 30. Particularly, by moving the aligning guide 20 by a speed in accordance with a speed of rotating the aligning drum 30 and a thickness of the rubber coated cord C1, the rubber coated cord C1 is wound in a spiral shape by a predetermined pitch P in accordance with the thickness of the cord to bond without producing a gap to constitute a layer on the aligning drum 30 to thereby form a cylinder-like member A1 having a predetermined length by the rubber coated cord C1 (FIG. 11).

The length in the axial direction of the cylinder-like member A1 on the sheet forming drum 30 is set to a length in consideration of a desired joint margin of the length in the tire circumferential direction of the carcass member A constituting the object of fabrication. The length in the axial direction of the cylinder-like member A1 can be set by a number of times of winding the rubber coated cord C1, further, also the length can be adjusted by a unit of one piece of the cord by increasing or reducing the winding number of times and can be adjusted finely near to be stepless.

Although the pitch P in winding the rubber coated cord C1 to the aligning drum 30 can be set in accordance with the thickness of the rubber coated cord C1 to be able to bond the cord without producing the gap, the thickness of the rubber coated cord C1 is determined by $\tan \gamma$ of the width of the carcass member A constituting the object of fabrication, and therefore, for example, when the carcass member of the width of 560 mm is formed by using the rubber coated cord having the cord thickness (diameter) of 0.985 mm, the angle is almost near to 0°, and therefore, the winding angle becomes substantially 90° relative to the width direction in parallel with the drum axis center.

Therefore, by forming the cylinder-like member A1 as described above, thereafter, cutting the cylinder-like member A1 at the portion of the slit 31 in the width direction in parallel with the drum axis center, the carcass member A in a sheet-like shape having the predetermined width and the predetermined length can be provided as shown by FIG. 12, by using the carcass member A in the sheet-like shape and directing the cut end in the tire circumferential direction by converting longitudinal and transverse directions, the carcass cord constitutes the angle of 90° substantially relative to the tire circumferential direction.

Further, when the sectional outer shape of the rubber coated cord C1 constitutes the elliptical shape, when the rubber coated cord C1 is wound around the aligning drum 30, by adjusting to change the direction of the elliptical shape of the guide hole 21 by pertinently pivoting the aligning guide 20, the pitch P of the cord can be changed by changing a mode of aligning the rubber coated cord C1.

For example, the direction of the long diameter of the elliptical shape can be changed to a skewed direction of a predetermined angle relative to the drum circumferential face as shown by FIG. 6, or the direction of the long diameter of the elliptical shape can be changed to a direction orthogonal to the drum circumferential face as shown by FIG. 7 by constituting a reference by a case of making the direction of the long diameter of the elliptical shape of FIG. 4 by the direction in parallel with the drum circumferential face. Thereby, as shown by FIG. 8, pitches P1, P2, P3 of the cord in the respective aligning modes differ from each other within in the range of the difference between the long diameter and the short diameter of the elliptical shape to constitute P1>P2>P3.

With regard to the direction of the elliptical shape, other than cases of pivoting to adjust the aligning guide 20 before starting to wind the cord and winding the cord by constructing the same pitch by a single shape of any of the respective aligning modes by directions of FIG. 4, FIG. 6, FIG. 7 over a total length, the cord can be wound by mixing to combine a plurality of aligning modes to change the direction of the elliptical shape in the midst of winding. In this case, the winding pitch or the like can finely be adjusted and the length in the axial direction by winding the rubber coated cord C1 can pertinently be adjusted.

Therefore, the pitch of winding the cord can arbitrarily be changed by using the same rubber coated cord C1, and a number of pieces or a density of the cord can freely be changed without changing the length in the axial direction of the cylinder-like member A1 formed, that is, the length in the circumferential direction of the carcass member A, further, conversely, the length in the axial direction of the cylinder-like member A1 formed, that is, the length in the circumferential direction of the carcass member A can be adjusted without changing the number of times of winding the cord on the aligning drum 30. That is, the length of the carcass member A can easily be changed in accordance with the change of the tire size, an adjustment as in a case of spirally winding a strip-like member having a width is dispensed with and a carcass member having an aimed mode or property can easily be provided.

The carcass member A in the sheet-like shape fabricated in this way is constituted by the sheet-like shape by cutting the cylinder-like member constituted by winding a single piece of the rubber coated cord in the direction in parallel with the axis center, and therefore, the carcass member A can be used as one sheet of the carcass member and a number of joint portions are not produced as in a case of bonding a number of cut pieces of a strip-like member and there is not a concern of deteriorating a weight balance of the tire.

Further, even when an end portion on a side of starting to wind the cord and an end portion on a side of finishing to wind the cord constituting the joint portions are disposed at positions deviated from the cut position, an amount of extrusion or a notch of the end portions is small, and therefore, the cord can easily be jointed on the building drum of the tire building step, and there is not a concern of deteriorating a tire uniformity without producing an extra recess or a projection at a portion of folding back the bead portion or the tire side portion.

Further, although in the above-described embodiment, an explanation has been given of a case in which the rubber coated cord C1 passing through the aligning guide 20 is wound in the spiral shape to constitute a layer by bonding the cord without producing the gap on the aligning drum 30, and by cutting the cord, the carcass member directed to the width direction in parallel with the drum axis center substantially by 90°, otherwise, the embodiment can also be utilized in a case of providing a carcass member used in a tire in which a ply cord of a carcass layer is inclined at least to a tire circumferential direction, or a carcass member used in a tire in which a region constituting a radial direction substantially orthogonal to the tire circumferential direction (within 90°±10°) and a region constituting a bias direction of 10 through 60° relative to the tire circumferential direction are mixed.

For example, in a case of providing a carcass member in which a cord is inclined in directions reverse to each other by constituting a boundary by a center in a tire width direction, when the rubber coated cord C1 is aligned in a required angle of inclination to be wound on the aligning drum 30 while guiding the rubber coated cord C1 by the aligning guide 20, the cord is wound spirally to constitute a layer as a whole by changing the direction of inclining the cord by reversing the direction of moving the aligning guide 20 at every half rotation of the aligning drum 30 by constituting a reference by the portion of the slit 31 for cutting to form a cylinder-like member of a predetermined length similar to the above-described embodiment, thereafter, the cylinder-like member is cut at the portion of the slit 31 in the width direction in parallel with the drum axis center. Thereby, the carcass member of a mode in which the cord is inclined as described above can easily be provided.

INDUSTRIAL APPLICABILITY

The method and the apparatus of fabricating the carcass member for a tire according to the invention can preferably be utilized for fabricating the carcass member used for the carcass layer of the radial tire.

BRIEF DESCRIPTION OF THE DRAWINGS

FIG. 1 is substantially a plane view showing an outline of a step of embodying a method of fabricating a carcass member for a tire of the invention.

FIG. 2 is substantially a side view of the same.

DESCRIPTION OF REFERENCE NUMERALS AND SIGNS

Figure 3:
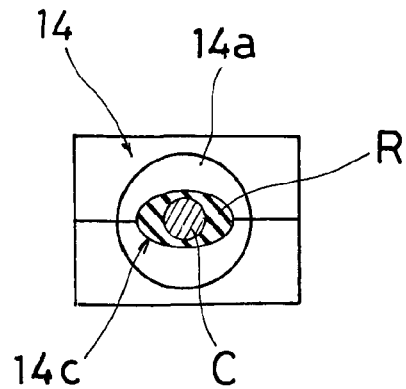
FIG. 3 is substantially a front view showing a shape of a mouth portion of an end portion on a delivery side of a coating die of the same.
Figure 4:
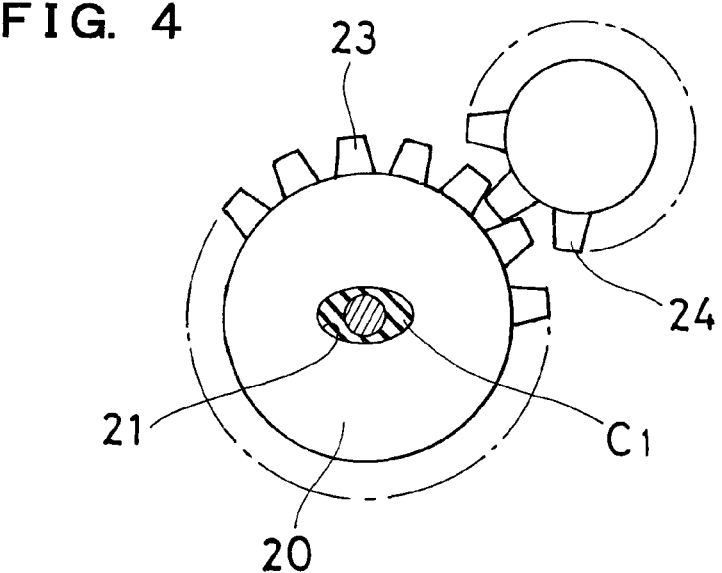
FIG. 4 is substantially a front view of a delivery side of an aligning guide of the same.
Figure 5:
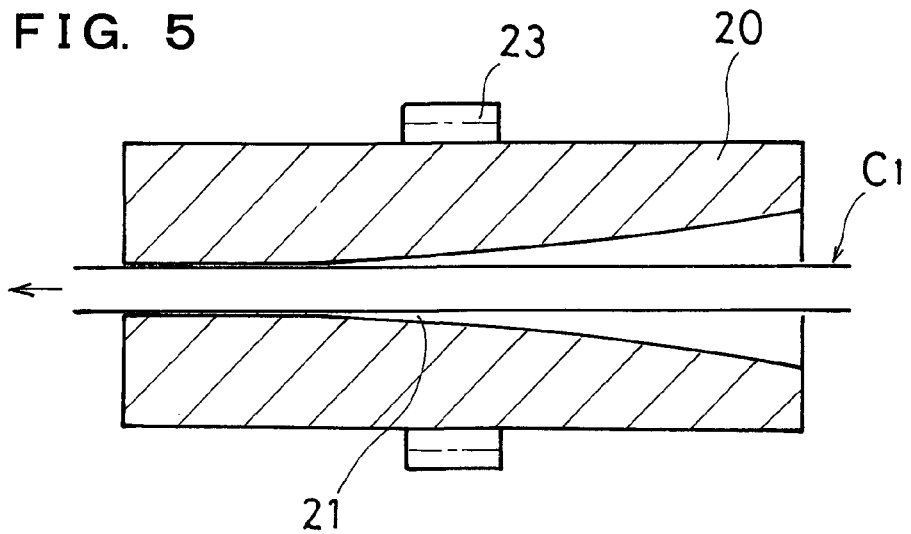
FIG. 5 is substantially a sectional view of the aligning guide of the same.
Figure 6:
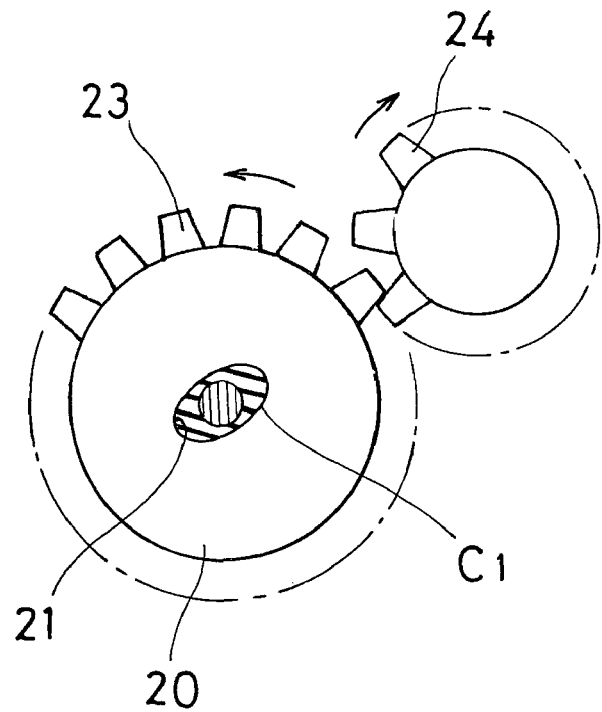
FIG. 6 is substantially a front view of the delivery side in a state of changing a direction of an elliptical shape of a shape of a mouth portion of the aligning guide of the same.
Figure 7:
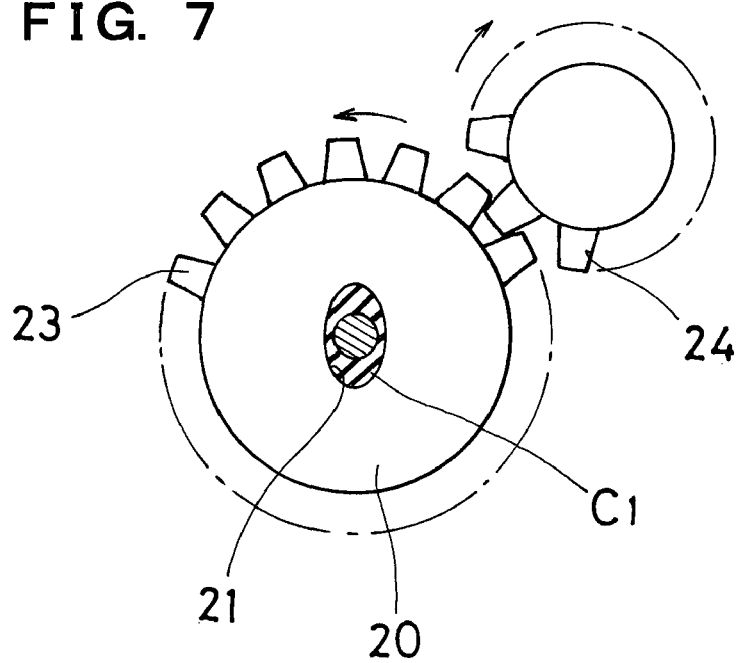
FIG. 7 is substantially a front view showing other example of a state of changing the direction of the elliptical shape of the mouth portion of the aligning guide of the same.
Figure 8:
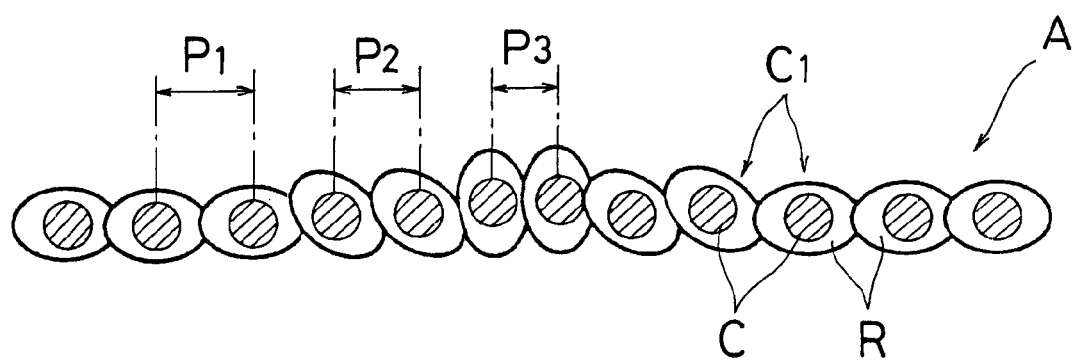
FIG. 8 is an explanatory view of a mode of aligning in which a direction of an elliptical shape of a rubber coated cord is changed.
Figure 9:
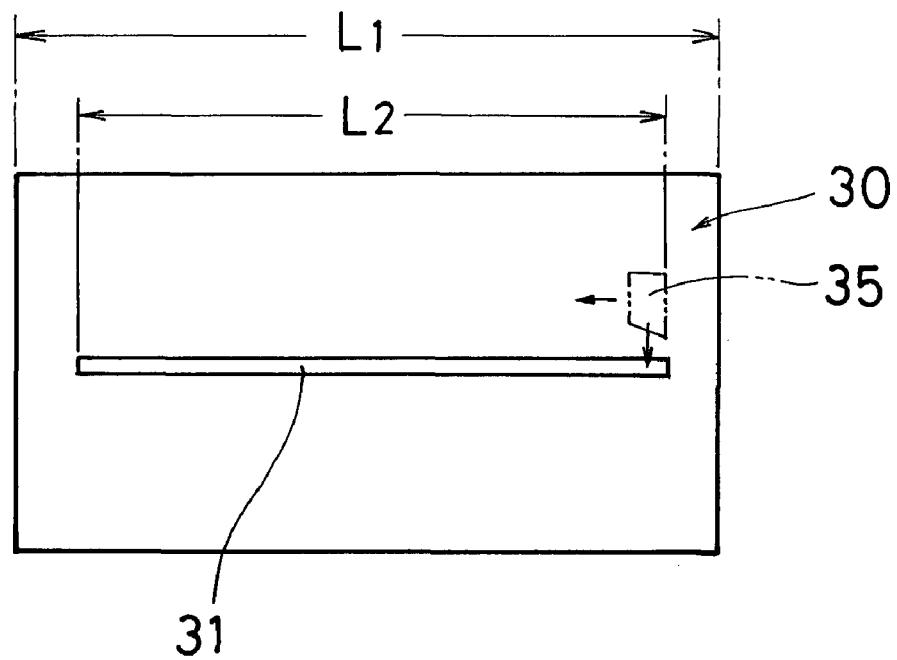
FIG. 9 is substantially a plane view of an aligning drum of the same.
Figure 10:
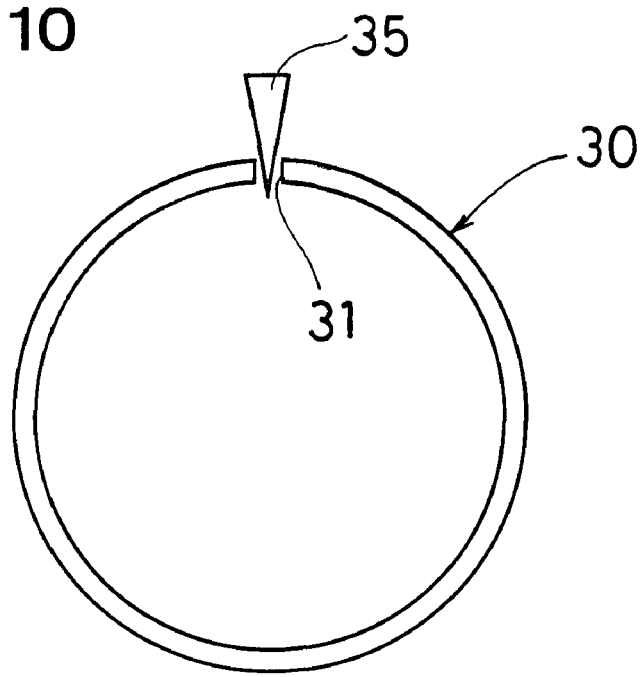
FIG. 10 is substantially a sectional view of the aligning drum of the same.
Figure 11:
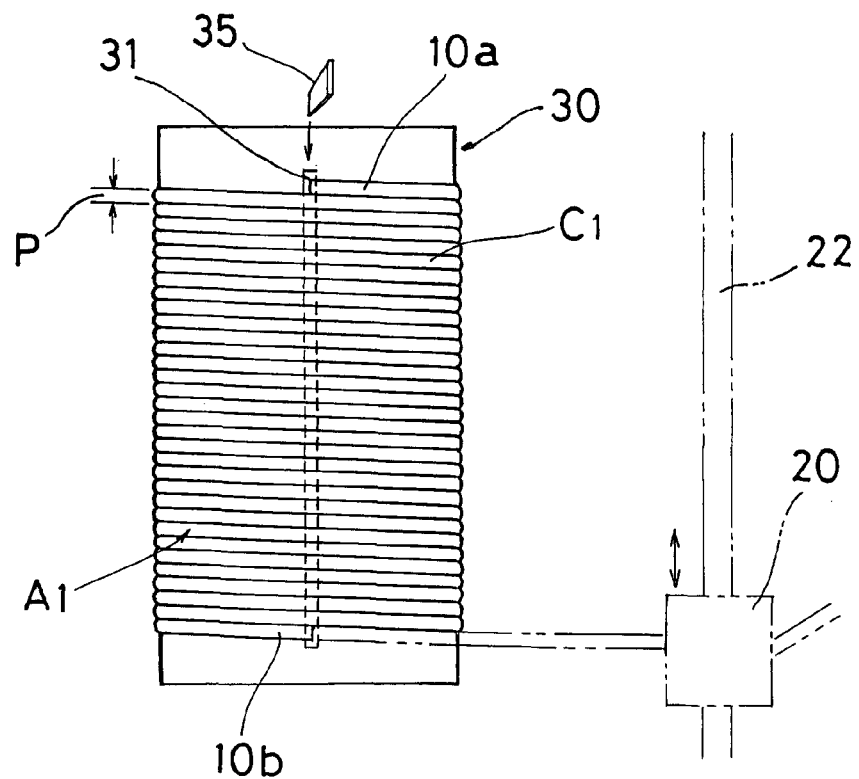
FIG. 11 is substantially a plane view of a state of winding the rubber coated cord on the aligning drum of the same.
Figure 12:
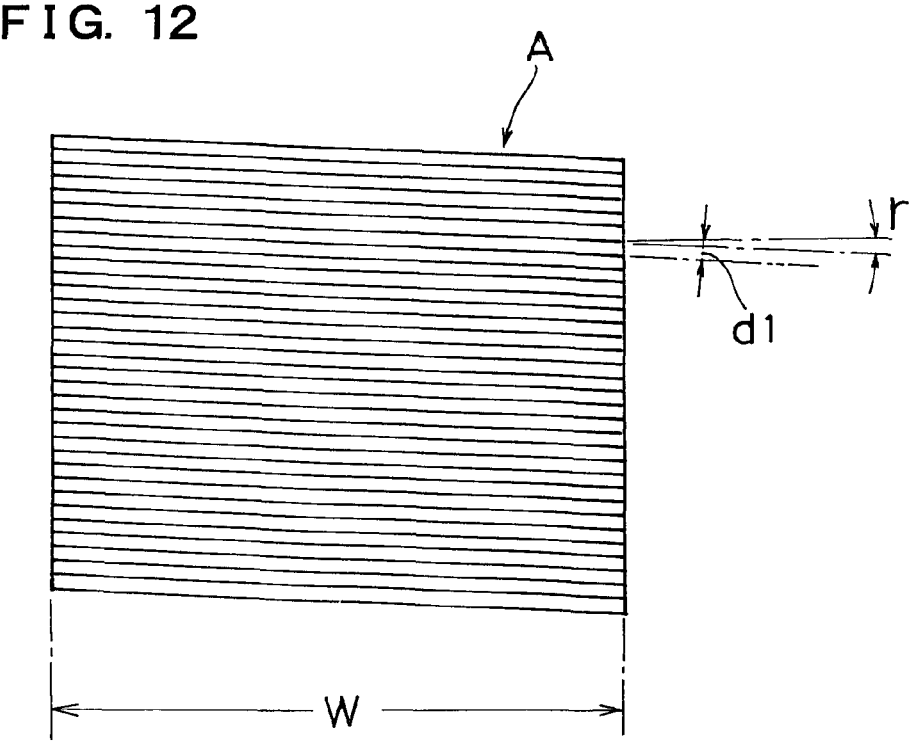
FIG. 12 is a plane view of a state of cutting a cylinder-like member to be developed in a sheet-like shape.
Figure 13:
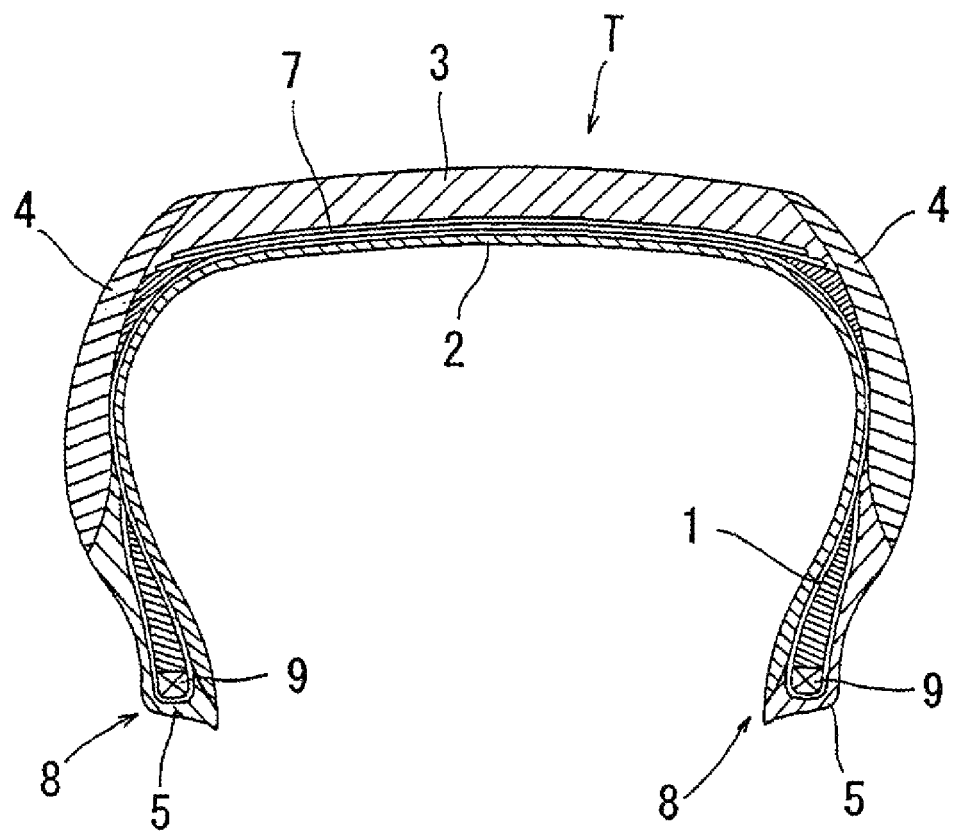
FIG. 13 is a sectional view exemplifying a structure of a tire.

T . . . tire, 1 . . . carcass layer, 2 . . . inner liner, 3 . . . tread, 4 . . . side wall, 5 . . . rim strip, 7 . . . belt layer, 8 . . . bead portion, 9 . . . bead core, 11 . . . supply portion of reinforcement cord, 12 . . . elongating roll, 13, 15, 18 . . . guide rolls, 14 . . . rubber coating die, 14$a$ . . . die main body, 14$b$ . . . extruder of rubber member, 14$c$ . . . mouth portion, 16 . . . heating apparatus, 17 . . . elongating apparatus, 20 . . . aligning guide, 21 . . . guide hole, 22 . . . guide means, 23 . . . gear, 24 . . . gear, 30 . . . aligning drum, 31 . . . slit for cutting guide, 35 . . . cutter, A1 . . . cylinder-like member, A . . . carcass member in sheet-like shape, P . . . pitch of winding, L1 . . . length in axial direction of cylindrical drum, L2 . . . length of slit, d1 . . . thickness of rubber coated cord, W . . . width of carcass member, γ . . . angle of cord relative to width direction

The invention claimed is:

1. An apparatus for fabricating a carcass member for a tire characterized by comprising:
    a portion for supplying one piece of a cord;
    a rubber coating die for coating rubber on the cord while passing the cord continuously drawn from the supply portion to shape a sectional outer shape in an elliptical shape;
    an aligning guide having a guide hole for passing a rubber coated cord passing through the rubber coating die, a shape of a mouth portion of at least an end portion of a delivery side of the guide hole constituting an elliptical shape in correspondence with the sectional outer shape of the rubber coated cord, and being provided pivotably centered on the guide hole to allow the aligning guide and the guide hole to rotate around a longitudinal axis of the guide hole, and capable of moving in a direction that intersects with a direction of feeding the rubber coated cord;
    an aligning drum which is a drum wound with the rubber coated cord passing through the aligning guide, made to be rotatable and centered on an axis center in parallel with the direction of moving the aligning guide and having a circumferential length in correspondence with a width of the carcass member constituting an object of fabrication; and
    a cutting apparatus for cutting a cylinder-like member formed by the rubber coated cord wound around the aligning drum in the direction in parallel with the drum axis center;
    wherein the aligning guide is constituted such that by controlling to rotate the aligning guide in accordance with moving the aligning guide, the rubber coated cord is made to be able to align to wind to bond to the aligning drum without producing a gap while adjusting a position of the rubber coated cord passing through the aligning guide and a direction of the elliptical shape in a rotation angle thereof around a longitudinal axis of the rubber coated cord on the aligning drum.

2. The apparatus for fabricating a carcass member for a tire according to claim 1, wherein a heating apparatus capable of heating the coated rubber of the rubber coated cord to some degree is provided at a portion of feeding the rubber coated cord from the rubber coating die to reach the aligning guide.

3. The apparatus for fabricating a carcass member for a tire according to claim 1, wherein the aligning drum is provided with a slit as a guide for cutting the rubber coated cord in a width direction in parallel with the axis center at one portion in a circumferential direction of the drum main body and a cylinder-like member formed by winding the rubber coated cord is made to be able to cut along the slit by a cutter of the cutting apparatus.

* * * * *